(No Model.)
R. A. MAYO.
PACKAGE HOLDING DEVICE FOR BICYCLES, &c.
No. 579,761. Patented Mar. 30, 1897.
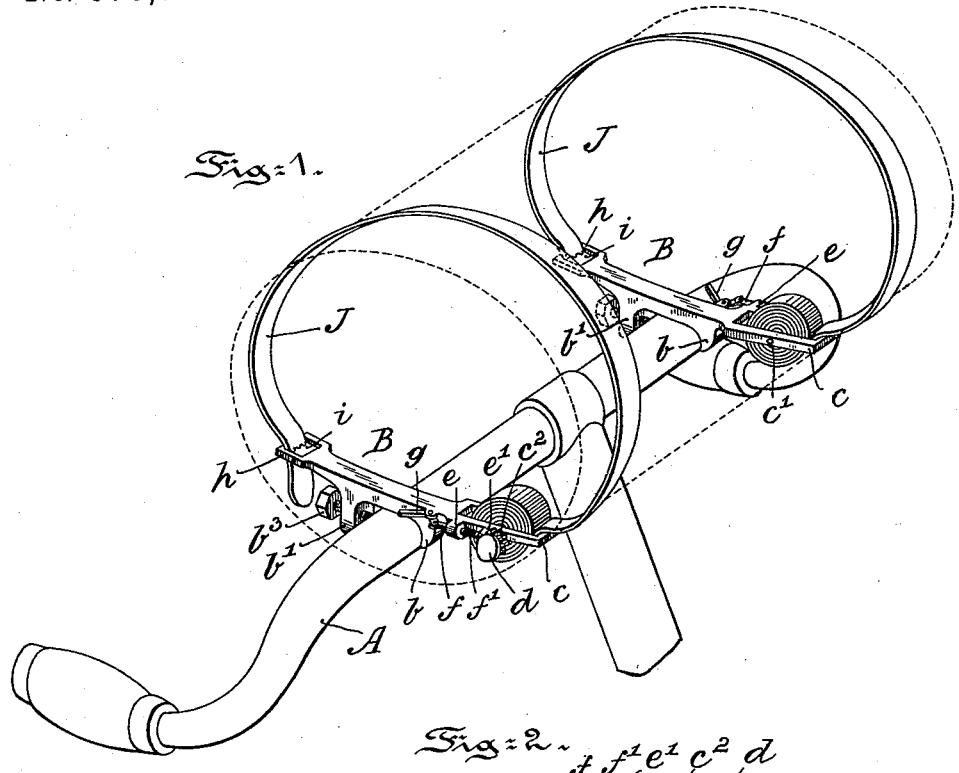
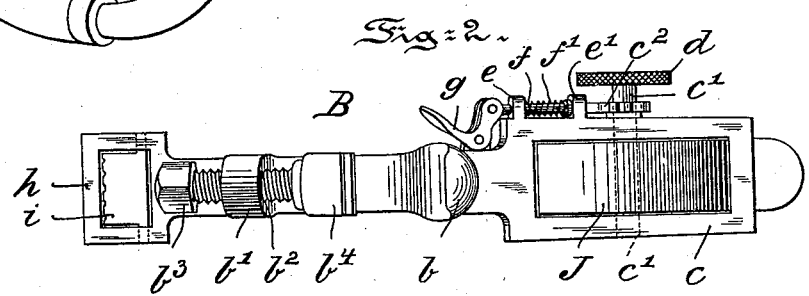
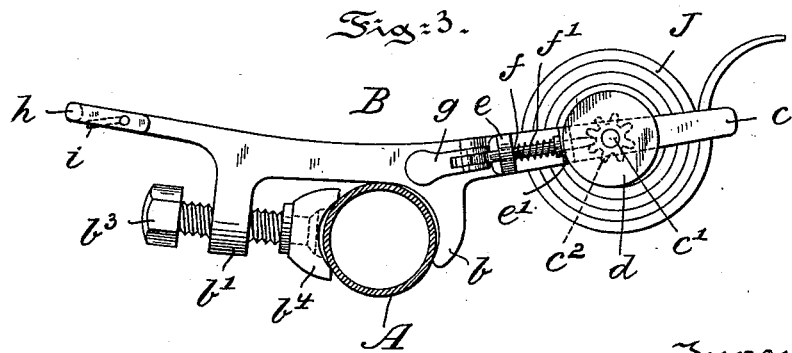
Witnesses:
Thomas M. Smith.
Richard C. Maxwell.
Inventor:
Robert A. Mayo.
By J. Walter Douglass
Attorney.
THE NORRIS PETERS CO., PHOTO-LITHO., WASHINGTON, D. C.

United States Patent Office.

ROBERT A. MAYO, OF PHILADELPHIA, PENNSYLVANIA.

PACKAGE-HOLDING DEVICE FOR BICYCLES, &c.

SPECIFICATION forming part of Letters Patent No. 579,761, dated March 30, 1897.

Application filed October 7, 1896. Serial No. 608,086. (No model.)

*To all whom it may concern:*

Be it known that I, ROBERT A. MAYO, a citizen of the United States, residing at the city of Philadelphia, in the county of Philadelphia and State of Pennsylvania, have invented certain new and useful Improvements in Package-Holding Devices for Bicycles or Similar Vehicles, of which the following is a specification.

My invention relates to a detachable device for holding packages or other articles for bicycles or similar vehicles.

The principal object of my invention is to provide a simple, durable, and effective device for application to the handle-bar or other part of a bicycle for readily inserting a package therein and so as to hold the same therefrom, the said device being arranged so as to readily take up slack and at the same time to permit of the quick release of the package therefrom.

My invention consists of a package-holding device for bicycles or similar vehicles, as hereinafter described and claimed.

The nature, scope, or characteristic features of my invention will be more fully understood from the following description taken in connection with the accompanying drawings, forming part hereof, and in which—

Figure 1 is a perspective view of a holder embodying main features of my invention in application to the handle-bar of a bicycle. Fig. 2 is a rear elevational view of the device; and Fig. 3 is a side elevational view of the same and a cross-sectional view of the handle-bar of a bicycle to which the same is applied and showing the detailed construction of the pawl-and-ratchet connection with the shaft of the holder, adapted to permit of the rolling of a strap into the same.

Referring to the drawings, A is the handle-bar of a bicycle of any suitable construction.

B is the package-holding device of my invention, consisting of two downward-projecting fingers $b$ and $b'$, one of which is preferably slightly curved, so as to contour with the handle-bar and the other straight, perforated and threaded internally, as at $b^2$, for the reception of a threaded bolt provided at one end with a nut or head $b^3$ and at the other end with a dish-shaped shoe $b^4$ for embracing in conjunction with the fixed curved arm $b$ the device B, so as to be firmly gripped to the handle-bar or the framework of the bicycle or similar vehicle. The holder is provided at one end with an oblong loop $c$ and through the center of which extends a rotatable shaft $c'$, carrying at the outer end of the same a ratchet-wheel $c^2$ and beyond the same a milled button $d$ for rotating said shaft. Formed integral with one side of the device are two perforated lugs $e$ and $e'$. Extending through these lugs is a pawl-rod $f$, having coiled around the same between the two lugs a spring $f'$. The forward end of this rod is connected with a bell-crank lever $g$, which is pivoted at one end to said rod $f$ and at or about the middle to the device B. This device is adapted to operate said rod against the tension of the spring $f'$, secured at one end to said rod and at the other end abutting against the lug $e'$ for releasing said pawl-lever from its engagement with the ratchet $c^2$.

At the other end of the device B is provided a loop $h$, having arranged therein a wing-shaped pivotal pinch-clamp $i$, which is adapted to be swung upward, so that by inserting a strip J between the outer wall of the said loop and the free end of said wing-shaped pinch-clamp the same may be caused to bite against the said strip and thereby to hold the same in a fixed position. The strip or fillet J may be of leather or of any other suitable material, as clearly illustrated in Fig. 1 of the drawings.

In use the strip or fillet is fastened to the shaft $c$ and wound thereon by the operation of the milled button $d$, while the free end of the strip is inserted through the opposite loop $h$ and securely held in the same by means of the wing-shaped pinch-clamp $i$, it being understood, however, that the device is first clamped to the handle-bar or framework of the bicycle by turning the movable shoe mounted on the threaded bolt until the shoe is brought in firm engagement with the said bar. Any slack in the strip or fillet after being caused to assume the position illustrated in Fig. 1 may be taken up by the turning of the thumb nut or button $d$, and any slackening of the holder required may be readily effected by exerting a pressure on the bell-crank hand-lever of the spring-controlled pawl to cause a disengagement of the same from the ratchet-wheel and thereby to loosen up the strip for the purpose of increasing the size of the loop formed for the insertion and holding of a package thereby. It may be here remarked that ordinarily two of said holders will be employed for containing packages, but such is not absolutely necessary, because one of them would answer the purpose by reason of the firmness with which the strip or fillet may be made to embrace a package for the holding of the same therefrom.

Having thus described the nature and objects of my invention, what I claim as new, and desire to secure by Letters Patent, is—

A device of the character described, comprising a bar provided at one end with an oblong loop having a cross-shaft journaled thereto and carrying a ratchet and a button for rotating said shaft and at the other end with a loop having a wing-shaped pinch-clamp for engaging a strap adapted to be coiled around said shaft, said bar provided with two depending fingers $b$ and $b'$, one of which is slightly curved and the other substantially straight, perforated transversely and threaded for the insertion of a bolt provided with a nut at one end and at the other with a shoe, lugs formed on one side of said bar and mounted in the same is a pawl-rod having a spring coiled around the same and the pawl of said rod normally engaging said ratchet and said rod at the other end provided with a bell-crank lever, substantially as and for the purposes described.

In testimony whereof I have hereunto set my signature in the presence of two subscribing witnesses.

ROBERT A. MAYO.

Witnesses:
J. WALTER DOUGLASS,
THOMAS M. SMITH.